United States Patent [19]

George et al.

[11] Patent Number: 5,068,289

[45] Date of Patent: * Nov. 26, 1991

[54] REINFORCED POLYMER COMPOSITIONS

[75] Inventors: Eric R. George; William P. Gergen, both of Houston, Tex.

[73] Assignee: Shell Oil Company, Houston, Tex.

[*] Notice: The portion of the term of this patent subsequent to Aug. 27, 2008 has been disclaimed.

[21] Appl. No.: 432,010

[22] Filed: Nov. 6, 1989

[51] Int. Cl.$^5$ .............................................. C08L 77/06
[52] U.S. Cl. .................................. 525/179; 525/426; 525/539; 525/919; 524/502
[58] Field of Search ............. 525/179, 539, 426, 919; 524/502

[56] References Cited

U.S. PATENT DOCUMENTS

| | | | |
|---|---|---|---|
| 3,694,412 | 9/1972 | Nozaki | 260/63 CQ |
| 4,783,503 | 11/1988 | Gergen et al. | 525/92 |
| 4,839,437 | 6/1989 | Gergen et al. | 525/426 |
| 4,880,865 | 11/1989 | George | 524/449 |

FOREIGN PATENT DOCUMENTS 121965 10/1984 European Pat. Off. .
257663 3/1988 European Pat. Off. .

*Primary Examiner*—John C. Bleutge
*Assistant Examiner*—Thomas Hamilton, III.
*Attorney, Agent, or Firm*—James O. Okorafor

[57] ABSTRACT

Improved mechanical properties are demonstrated by reinforced polymeric blends comprising (a) a major proportion of a linear alternating polymer of carbon monoxide and at least one ethylenically unsaturated hydrocarbon, (b) a polyamide and (c) optionally, an acidic polymer containing moieties of an $\alpha$-olefin and an $\alpha,\beta$-ethylenically unsaturated carboxylic acid, optionally with a portion of the carboxylic acid sites of the polymer neutralized with non-alkali metal, the polymeric blend being reinforced by the incorporation therein of glass fibers.

18 Claims, No Drawings

REINFORCED POLYMER COMPOSITIONS

FIELD OF THE INVENTION

This invention relates to reinforced blends comprising a linear alternating polymer of carbon monoxide and at least one ethylenically unsaturated hydrocarbon. More particularly, the invention relates to blends of the linear alternating polymer with a polymeric polyamide and optionally an acidic polymeric material containing moieties of an α-olefin and an α,β-ethylenically unsaturated carboxylic acid, which blends are reinforced by incorporation therein of glass fibers.

BACKGROUND OF THE INVENTION

The class of polymers of carbon monoxide and olefin(s) is well known in the art. Brubaker, U.S. Pat. No. 2,495,286, produced such polymers of relatively low carbon monoxide content in the presence of free radical initiators, e.g., peroxy compounds. U.K. 1,081,304 discloses such polymers of higher carbon monoxide content produced by employing alkylphosphine complexes of palladium salts as catalyst. Nozaki extended the reaction to produce linear alternating polymers in the presence of triarylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. These linear alternating polymers, now known as polyketones or polyketone polymer are produced by more recent processes which are illustrated by a number of published European Patent applications including 121,965, 181,014, 213,671 and 257,663. These processes typically involve the use of a catalyst composition formed from a salt of a Group VIII metal selected from palladium, cobalt or nickel, the anion of a strong non-hydrohalogenic acid and a bidentate ligand of phosphorus, arsenic or antimony.

The resulting polymers are relatively high molecular weight having established utility as premium thermoplastics in the production of shaped articles which are produced by processing the polymer by well known methods. For some particular applications, it has been found desirable to have properties which are somewhat different from those of the polyketone polymer. It would be of advantage to retain the desirable properties of the polyketone polymer and yet improve other properties. One method of obtaining such advantages is by providing reinforcing material to the polymer, e.g., glass, ceramic or carbon fibers. Copending U.S. patent application Ser. No. 289,157, filed Dec. 23, 1988, discloses compositions of the linear alternating polymer with glass reinforcements. Copending U.S. patent application Ser. No. 203,960, filed June 8, 1988, provides blends of the polyketone polymers and polymers of α-olefin and α,β-ethylenically unsaturated carboxylic acid. It would be desirable to provide other blends of the linear alternating polymer with other polymeric material and thereby obtain improved properties.

SUMMARY OF THE INVENTION

The present invention provides reinforced polymer blends of linear alternating of carbon monoxide and at least one ethylenically unsaturated hydrocarbon. More particularly, the present invention provides glass fiber-reinforced blends of a major proportion of the linear alternating polymer with a minor proportion of a polymeric polyamide and, optionally, an acidic polymeric material incorporating moieties of an α-olefin and an α,β-ethylenically unsaturated carboxylic acid wherein, optionally, a portion of the carboxylic acid groups are neutralized with non-alkali metal.

DESCRIPTION OF THE INVENTION

The polyketone polymers which are employed as the major component of the reinforced blends of the invention are linear alternating polymers of carbon monoxide and at least one ethylenically unsaturated hydrocarbon and contain substantially one molecule of carbon monoxide for each molecule of ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second hydrocarbon of at least 3 carbon atoms, particularly an α-olefin such as propylene.

When the preferred terpolymers are to be employed as the major component of the reinforced blends of the invention there will be at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula $$-CO-CH_2-CH_2]_x[CO-G)]_y \qquad (I)$$

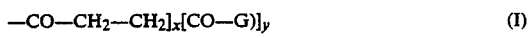

wherein G is the moiety of an ethylenically unsaturated hydrocarbon of at least 3 carbon atoms polymerized through the ethylenic unsaturation. The $-CO-CH_2CH_2-$ units and the $-CO-G-$ units are found randomly throughout the polymer chain and the ratio of y:x is no more than about 0.5. In the modification of the invention wherein copolymers of carbon monoxide and ethylene are employed as the major component in the blends of the invention there will be no second hydrocarbon present and the copolymers are represented by the above formula I wherein y is zero. When y is other than zero, i.e., terpolymers are employed, the preferred ratios of y:x will be from about 0.01 to about 0.1. The end groups or "caps" of the polymer chain will depend upon what materials were present during the production of the polymer and how and whether the polymer has been purified. The end groups are of little apparent importance so far as the overall properties of the polymer are concerned so that the polymers are fairly represented by the polymeric chain as above depicted.

Of particular interest are the polyketone polymers of number average molecular weight from about 1000 to about 200,000, particularly those polyketone polymers of number average molecular weight from about 20,000 to about 90,000 as determined by gel permeation chromatography. The physical properties of the polymers will depend in part upon the molecular weight, whether the polymer is a copolymer or a terpolymer and, in the case of terpolymers, the nature of and the proportion of the second hydrocarbon present. The polyketone polymers typically have melting points from about 175° C. to about 300° C., preferably from about 210° C. to about 270° C. The polymers will have a limiting viscosity number (LVN), measured in m-cresol at 60° C. in a standard capillary viscosity measuring device, of from about 0.4 dl/g to about 10 dl/g, preferably from about 0.8 dl/g to about 4 dl/g.

The method for the production of the linear alternating polymers is illustrated by the above published European Patent Applications. In general, the monomeric reactants are contacted under polymerization conditions in the presence of a reaction diluent and a catalyst composition formed from a palladium compound, the anion of a strong non-hydrohalogenic acid and a bidentate phosphorus ligand. The scope of the process for the production of the polyketone polymers is extensive but, without wishing to be limited, a preferred palladium compound is a palladium carboxylate, particularly palladium acetate, a preferred anion is the anion of trifluoroacetic acid or p-toluenesulfonic acid, and a preferred bidentate phosphorus ligand is 1,3-bis(diphenylphosphino)propane or 1,3-bis[di(2-methoxyphenyl)phosphino]propane.

The reaction diluent in which the reactants are contacted is preferably an alkanol such as methanol or ethanol. Methanol is preferred. Reactant contact with the catalyst composition and diluent is maintained by conventional methods such as shaking or stirring and subsequent to polymerization the reaction is terminated as by cooling the reactor and contents and by releasing the pressure. Typical polymerization conditions include a reaction temperature from about 20° C. to about 150° C. although temperatures from about 50° C. to about 135° C. are more often employed. The reaction pressure is from about 1 atmosphere to about 200 atmospheres, preferably from about 10 atmospheres to about 100 atmospheres. The polyketone product is obtained as a substantially insoluble material in the reaction diluent and is recovered by well known procedures such as filtration or decantation. The polyketone polymer is used in the blends of the invention as recovered or alternatively is purified as by contact with a solvent or a complexing agent which is selective for catalyst residues.

The second component of the reinforced blends of the invention, present as a minor component, is a polymeric polyamide. By the term "polyamide" is meant a polymeric condensation product which contains recurring amide groups as integral parts of the polymeric chain. These polyamides are well known in the art and are often referred to as Nylons. Suitable polyamides for use in the reinforced blends of the invention are crystalline or amorphous polymers of linear or branched structure and a molecular weight of at least about 5000. The preferred polyamides are linear in structure, wherein each recurring monomeric unit has up to 16 carbon atoms inclusive, and have melting points in excess of 200° C.

In one embodiment of the polyamide blend component the polyamide is homopolymeric in character illustratively being a homopolymer of a terminal amino carboxylic acid of up to 16 carbon atoms although in practice the monomeric unit is typically provided as a lactam, e.g., butyrolactam, caprolactam or lauryllactam. Such polyamides are often identified by the number of carbon atoms in the monomeric unit. For example the polyamide derived from 6-aminocaproic acid, or alternatively from caprolactam, is termed Nylon 6.

In another embodiment of the polyamide blend component the polyamide is copolymeric in character and is illustratively represented as the condensation product of a primary diamine and a dicarboxylic acid. The primary diamine is a terminal primary diamine having up to 16 carbon atoms inclusive and at least two carbon atoms between the primary amino groups, each of which is located on a terminal carbon atom of the diamine structure. The diamines suitably contain aromatic moieties linking the amino groups as illustrated by phenylenediamine, 4,4'-diaminobiphenyl and di(4-aminophenyl) ether, or a cycloaliphatic linking group as in the case of di(4-aminocyclohexyl)methane or 1,4-diaminocycllooctane. The preferred diamines, however, are the acyclic terminal primary diamines of the formula $$H_2N-CH_2)_nNH_2 \qquad (II)$$

wherein n is an integer from 2 to 16 inclusive. Such polymethylenediamines include trimethylenediamine, tetramethylenediamine, hexamethylenediamine, decamethylenediamine and hexadecamethylenediamine. Of these diamines, hexamethylenediamine is preferred.

The dicarboxylic acid precursor of the copolymeric diamines suitably has up to 16 carbon atoms inclusive as illustrated by aromatic dicarboxylic acids such as terephthalic acid and 2,6-naphthalenedicarboxylic acid. The preferred dicarboxylic acids, however, are aliphatic dicarboxylic acids, particularly those of the formula $$HO_2C-CH_2)_mCO_2H \qquad (III)$$

wherein m is an integer from 0 to 14 inclusive. Illustrative of these dicarboxylic acids are oxalic acid, pimelic acid, sebacic acid, suberic acid, undecanedioic acid and adipic acid. Adipic acid is particularly preferred.

The production of the copolymeric polyamide blend components is well known and conventional in the art. It should be understood that although the copolymeric polyamides are represented as the condensation product of primary diamines and dicarboxylic acids, this representation is for convenience and the acid monomer may suitably be provided in some equivalent form, for example as the dialkyl ester of the dicarboxylic acid. The copolymeric polyamides are also identified by the number of carbon atoms in the amine and acid monomeric units respectively. By way of illustration, the condensation product conceptually produced from hexamethylenediamine and adipic acid is termed Nylon 6,6. The polyamide illustratively produced from hexamethylenediamine and dodecanedioic acid is termed Nylon 6,12.

The polyamide is present as a minor component of the reinforced blends of the invention. For some applications the presence of polyamide in amounts as low as about 0.1% by weight, based on total non-reinforced polymer blend is satisfactory. A quantity of polyamide of about 30% by weight on the same basis represents a preferred upper limit for the polyamide in blends in which a polyketone polymer is the major component. The preferred reinforced blends of the invention contain from about 2% by weight to about 20% by weight of polyamide, based on total non-reinforced polymer blend.

The third polymeric component of the reinforced blends of the invention is optionally employed and is not required to be present in the blends. This component, a minor component, is an acidic polymer containing moieties of an α-olefin and an α,β-ethylenically unsaturated carboxylic acid, optionally containing a third monomer and optionally having a portion of the carboxylic acid groups neutralized with a non-alkali metal. The α-olefin monomer of the optional acidic polymer is an α-olefin of up to 10 carbon atoms inclusive such as ethylene, propylene, isobutylene, 1-butene, 1-octene and 1-decene. Preferred α-olefins are straight chain α-olefins of up to 4 carbon atoms inclusive and particularly preferred is ethylene. The α-olefin monomer of this optional acidic polymer third component is preferably present in at least 65% by mole, based on total acidic polymer, and is preferably present in at least 80% by mole on the same basis.

The α,β-ethylenically unsaturated carboxylic acid monomer of the optional third polymeric blend component has up to 10 carbon atoms inclusive and is illustrated by acrylic acid, methacrylic acid, 2-hexenoic acid, 2-octenoic acid and 2-decenoic acid. The preferred α,β-unsaturated carboxylic acids have up to 4 carbon atoms inclusive. These acids are acrylic acid, methacrylic acid and crotonic acid, of which acrylic acid and methacrylic acid are particularly preferred. The unsaturated acid monomer of the optional third polymeric blend component is present in an amount from about 1% by mole to about 35% by mole based on total optional acidic polymer, but amounts of unsaturated acid monomer from about 5% by mole to about 20% by mole on the same basis are preferred.

The acidic polymeric optional third blend component is suitably a copolymer of the α-olefin and the α,β-ethylenically unsaturated carboxylic acid and in general such copolymers are preferred as the optional blend component. On occasion, however, it is useful to incorporate as an optional monomer in the acidic polymeric blend component a non-acidic, low molecular weight polymerizable monomer of up to 8 carbon atoms inclusive. Such optional third monomer may be another α-olefin such as propylene or styrene when the major α-olefin is ethylene, an unsaturated ester such as vinyl acetate or methyl acrylate, an unsaturated halohydrocarbon such as vinyl chloride or vinyl fluoride or an unsaturated nitrile such as acrylonitrile. As previously stated the presence of this third monomer in the acidic polymer is optional and is not required. When the third monomer is present amounts of the third monomer up to about 5% by mole based on total acidic polymer are satisfactory with amounts up to about 3% by mole on the same basis being preferred.

Independent of whether this optional third polymeric blend component is a copolymer or a terpolymer, in an optional embodiment of this acidic polymer a portion of the acid groups present in the polymer are neutralized with a non-alkali metal. When partially neutralized this optional blend component is polymeric in form while exhibiting ionic character and is of a well known class of materials conventionally referred to as ionomers. In the partially neutralized embodiment, the α-olefin/unsaturated acid polymer, with or without the presence of the non-acidic low molecular weight polymerizable monomer, is reacted with a source of ionizable metal compound, preferably ionizable zinc, magnesium or aluminum compound, sufficient to neutralize from about 10% to about 90% of the carboxylic acid groups present in the polymer. Such neutralization, particularly with zinc, the preferred metal, results in a uniform distribution of the metal throughout the polymer. Neutralization of from about 20% to about 80% of the carboxylic acid groups is preferred and neutralization of from about 25% to about 75% of the carboxylic acid groups is particularly preferred. The ionizable metal compound utilized in the neutralization is a source of complexed or uncomplexed non-alkali metal ions, especially zinc, magnesium and aluminum ions, which are provided in compounds of the type often referred to as uncomplexed metal salts, e.g., zinc chloride, zinc acetate or zinc formate, or are provided as complexed metal salts wherein the metal is bonded to two types of groups, at least one of which is readily ionized from the metal and at least one is not. Illustrative of such complexed metal salts are mixed zinc salts with one weak acid such as oleic acid or stearic acid and one more ionizable acid such as acetic acid or formic acid. In general, neutralization with a complexed zinc ion is the more preferred.

The optionally partially neutralized polymers employed as the optional third polymeric blend component are broadly conventional and many are commercial. Copolymers of ethylene and acrylic acid are marketed by Dow under the trademark PRIMACOR® and copolymers of ethylene and methacrylic acid are marketed by DuPont under the trademark NUCREL®. Partially neutralized polymers are marketed by DuPont under the trademark SURLYN®. The presence of such an acidic polymer in the blends of the invention is optional and none is required. When the optional third polymeric blend component is employed, amounts up to about 10% by weight based on total non-reinforced blend are satisfactory with amounts from about 0.1% by weight to about 5% by weight on the same basis being preferred.

Independent of whether the polymeric blends of the invention contain two or three polymeric components, the polymeric compositions are reinforced by incorporating in the compositions a minor amount, relative to the polymer, of fibrous glass reinforcement. The term "glass" is employed in the conventional meaning to indicate that class of complex metal silicates which are commonly referred to as glasses. Although the addition of rare earth metal oxides or transition metal oxides to other metal silicates on occasion will produce a glass of rather exotic properties, the glass from which the reinforcing glass fibers of the invention are produced is the more common alkali metal silicate glass, particularly a sodium silicate glass. Fibers produced of such glass are conventional and are commercially available from a number of U.S. and foreign glass companies. The fibers are useful as reinforcements for polymeric materials and are commercially used as such. However, the physical dimensions of the glass fibers are of some importance to successful utilization in a particular application as are the presence or absence of a sizing material on a coupling agent for the glass and the nature of the sizing or coupling agent.

In the polymer blends of the invention the glass fibers which contribute the most desirable properties to the blends are chopped glass fibers of circular cross section. The fibers range in diameter from about $2 \times 10^{-4}$ inch to about $8 \times 10^{-4}$ inch, preferably from about $4 \times 10^{-4}$ inch to about $7 \times 10^{-4}$ inch. Fibers of greater or lesser diameter are satisfactory but fibers of too small a diameter do not provide the desired strength and fibers of too large a diameter contribute too much weight for the resulting strength and may not be economical. Although in some applications the use of long continuous fibers of glass is satisfactory, in the reinforced blends of the invention it is preferred to use short fibers of glass. Lengths of glass fiber from about 0.1 inch to about 0.5 inch are suitable. While somewhat longer or somewhat shorter lengths are also useful, too long a glass fiber detracts from the processability of the composition while too short a fiber does not provide the desired strength. It should be recognized that the actual length of the glass fibers when actually present in the reinforced blend will depend to some extent on the method of blending or mixing the components, as this process may mechanically reduce the length of the glass fibers.

The glass fibers to be used as reinforcements for plastic materials such as the blends of the invention will customarily be provided by the manufacturer with a coating of a sizing material or a coupling agent, which terms are often used interchangeably. The nature of the coupling or sizing agent will influence the interfacial shear strength of the fiber and the polymer matrix, i.e., the degree to which the polymer and the glass fiber will adhere. Improvement in mechanical properties such as tensile strength result when a relatively high degree of adhesion occurs between the polymeric blend and the fiber and to contribute strength to the polymer blend there must be good adhesion between the polymer and the fiber. The interfacial shear strength is influenced by a number of factors including the polarity of the polymer so that certain sizings or coupling agents work better than others. For the blends of the invention containing a polyketone polymer as a major component, a variety of sizings are available. Such sizings are generally characterized by the general nature of the size rather than the specific chemical structures which are often proprietary to the glass manufacturer. Suitable sizings include water emulsions of starch and lubricating oil, aqueous dispersions of surface active materials and lubricants, silicon-containing materials such as vinyl silanes, alkyltrimethoxysilanes, amino silanes, trimethoxysilanes which also contain methane, acrylate or epoxy functionalities, and non-polar hydrocarbons. For use with the fibers of the reinforced blends of the invention, polar sizings are preferred such as a sizing having a trimethoxysilane end group attached to a hydrocarbon chain with a terminal urethane functionality. Other hydrocarbon sizings having a trimethoxysilane end group are also satisfactory. Such fibers are commercially available and are exemplified by OCF 492 ® Fiberglass and OCF 457 ® Fiberglass which are available from Owens-Corning Fiberglass.

The amount of glass fiber to be incorporated into the blends is a minor amount relative to the total polymer. Amounts of glass fiber loading from about 1% by weight to about 45% by weight, based on the total reinforced blend are satisfactory with amounts from about 5% by weight to about 35% by weight on the same basis being preferred.

The method of producing the reinforced blends of the invention is not critical so long as a uniform mixture of the blend components is obtained which will not delaminate upon processing. In one embodiment the polymeric materials are blended and the glass fiber is subsequently added. Alternatively the polymeric components are blended and uniformly mixed with the glass fibers in a single operation. In one method of blending the components are dry mixed and converted to a reinforced blend by passage through a twin screw co-rotating extruder to produce the reinforced blend as a extrudate. In another modification the components are blended in a high speed mixing device which exhibits high shear and thermal energy.

The reinforced blends of the invention may also include other conventional materials such as antioxidants, stabilizers, mold release agents and fire retardant materials which are designed to improve the processability of the polymeric materials or to improve the properties of the reinforced blend. Such materials are provided prior to, together with or subsequent to the combining of the polymeric blend components and the glass fibers.

The reinforced polymer blends of the invention exhibit a reduced degree of mold shrinkage and have mechanical properties which are improved over the polyketone polymer or even the polymeric blend without glass fiber. The reinforced blends are processed by methods which are conventional for reinforced thermoplastics such as injection molding, pressure forming and extrusion to produce shaped objects of established utility. The reinforced blends find particular application in the production of mechanical parts such as automotive body parts, particularly those such as fenders having a large and continuous surface where strength, uniformity and dimensional stability are important.

The reinforced compositions of the invention are further illustrated by the following Illustrative Embodiments which should not be construed as limiting the invention.

ILLUSTRATIVE EMBODIMENT I

A linear alternating terpolymer of carbon monoxide, ethylene and propylene [88/005] was produced in the presence of a catalyst composition formed from palladium acetate, trifluoroacetic acid and 1,3-bis[di(2-methoxyphenyl)phosphino]propane. The terpolymer had a melting point of 220° C. and a limiting viscosity number (LVN), measured in m-cresol at 60° C., of 1.79 dl/g.

ILLUSTRATIVE EMBODIMENT II

Blends of the terpolymer of Illustrative Embodiment I were produced with 2% by weight of NUCREL ® 010, 30% by weight of OCF ® 492 AA fiberglass and varying amounts of ZYTEL ® 101, a commercial Nylon 6,6. The blends were prepared by compounding on a 30 mm corotating twin screw extruder. For a determination of physical properties, specimens were prepared by injection molding standard test specimens and certain physical properties of the reinforced blends were determined by standard tests. The results are shown in Table 1.

TABLE 1

| Property Tested | % by weight ZYTEL ® 101 | | |
|---|---|---|---|
| | 0 | 2 | 5 |
| Tensile strength at yield (psi) | 8,600 psi | 9,500 | 10,000 |
| Elongation at break (%) | 10.8% | 8.4 | 8.5 |
| Notched Izod, room temp. (ft.lb/in) | 2.4 ft/lb/in | 2.2 | 2.1 |
| Flex modulus (psi) | 918,000 psi | 906,000 | 900,000 |
| Flex strength (psi) | 13,600 psi | 14,000 | 14,200 |
| Heat distortion temperature, °C. | 129 | 168 | 155 |

ILLUSTRATIVE EMBODIMENT III

A similar terpolymer to that from Illustrative Embodiment I [88/008] was used with ZYTEL 101®, OCF 492® fiberglass andd PRIMACOR® 1410. This terpolymer had a melting point of 223° C. and an LVN of 1.73.

Table 2 lists the physical properties upon the addition of 2 wt % PRIMACOR® 1410, 20 wt % fiberglass, and increasing amounts of Nylon up to 10 wt %. The addition of PRIMACOR® alone slightly increased modulus and notched izod impact, decreased tensile strength, and significantly increased the elongation at break.

TABLE 2

Mechanical Properties of Reinforced Blends Containing Nylon and PRIMACOR® 1410

| Sample | Flexural Modulus (psi) | Tensile Strength at Yield (psi) | Notched Izod Impact (Ft.lb./in) | Elongation to Break (%) |
|---|---|---|---|---|
| 1. Control (88/008) | 248,000 | 8800 | 4.0 | 243 |
| 2. +2% PRIMACOR® 1410 | 249,000 | 8300 | 4.4 | 445 |
| 3. +20% OCF 492® | 711,000 | 9600 | 1.6 | 31 |
| 4. 2% PRIMACOR® 1410 20% OCF 492® | 797,000 | 8800 | 1.9 | 40 |
| 5. 2% PRIMACOR® 1410 20% OCF 492® 2% Nylon | 786,000 | 8800 | 2.0 | 45 |
| 6. 2% PRIMACOR® 1410 20% OCF 492® 5% Nylon | 792,000 | 8900 | 2.1 | 43 |
| 7. 2% PRIMACOR® 1410 20% OCF 492® 10% Nylon | 883,000 | 9100 | 2.5 | 49 |

Table 3 lists mechanical properties for systems containing PRIMACOR® and Nylon without fiberglass. Ten percent Nylon increased modulus and strength while sacrificing impact strength and elongation at break. Combinations of PRIMACOR® and Nylon at low content produced little change in mechanical properties.

TABLE 3

Mechanical Properties of Unreinforced Blends Containing Nylon and PRIMACOR® 1410

| Sample | Flexural Modulus (psi) | Tensile Strength at Yield (psi) | Notched Izod Impact (Ft.lb./in) | Elongation to Break (%) |
|---|---|---|---|---|
| Control (88/008) | 248,000 | 8800 | 4.0 | 243 |
| +2% PRIMACOR® 1410 | 249,000 | 8300 | 4.4 | 445 |
| +2% PRIMACOR® 1410 2% Nylon | 249,000 | 8400 | 4.2 | 360 |
| +2% PRIMACOR® 1410 5% Nylon | 269,000 | 8500 | 4.5 | 348 |
| +10% Nylon | 307,000 | 9000 | 4.0 | 168 |

What is claimed is:

1. A glass fiber reinforced blend which comprises (a) a major proportion of a linear alternating polymer of carbon monoxide and at least one ethylenically unsaturated hydrocarbon, (b) a polymeric polyamide having recurring amide groups in the polymeric chain and (c) an acidic polymer containing moieties of an α-olefin, an α,β-ethylenically unsaturated carboxylic acid and as an optional monomer a non-acidic low molecular weight polymerizable monomer, a portion of the acid groups of the acidic polymer optionally neutralized with non-alkali metal, the glass being present in an amount of from about 1% by weight to about 45% by weight based on total blend.

2. The blend of claim 1 wherein the linear alternating polymer is of the repeating formula $$-CO-CH_2-CH_2)_x[CO-G]_y$$

wherein G is the moiety of an ethylenically unsaturated hydrocarbon of at least 3 carbon atoms polymerized through the ethylene unsaturation and the ratio of y:x is no more than about 0.5.

3. The blend of claim 2 wherein the polyamide has recurring monomer units of up to 16 carbon atoms and the polyamide is present in a quantity up to 30% by weight based on total non-reinforced polymer.

4. The blend of claim 3 wherein the acidic polymer is a copolymer of ethylene and acrylic acid or methacrylic acid.

5. The blend of claim 4 wherein the polyamide is homopolymeric in character.

6. The blend of claim 5 wherein the polyamide is a polymer of caprolactam.

7. The blend of claim 6 wherein the acidic polymer is non-neutralized and is present in an amount up to about 10% by weight, based on total non-reinforced polymer.

8. The blend of claim 7 wherein the polyamide is a copolymer of a terminal primary diamine of the formula $$H_2N-CH_2)_nNH_2$$

and the dicarboxylic acid of the formula $$HO_2C-CH_2)_mCO_2H$$

wherein n independently is an integer from 2 to 16 inclusive and m is an integer from 0 to 14 inclusive.

9. The blend of claim 8 wherein y is zero.

10. The blend of claim 8 wherein G is a moiety of propylene and the ratio of y:x is from about 0.01 to about 0.1.

11. The blend of claim 10 wherein the acidic polymer has from about 10% to about 90% of the carboxylic acid groups present neutralized with zinc, aluminum or magnesium, the acidic polymer being present in the blend in an amount from about 0.1% by weight to about 5% by weight based on total non-reinforced polymer.

12. The blend of claim 10 wherein the polyamide is a copolymer of hexamethylenediamine and adipic acid.

13. The blend of claim 12 wherein the polyamide is present in an amount from about 2% by weight to about 20% by weight based on total non-reinforced polymer.

14. The blend of claim 13 wherein the acidic polymer is a non-neutralized copolymer of ethylene and acrylic acid present in an amount of from about 1% by weight to about 5% by weight based on non-reinforced polymer.

15. The blend of claim 13 wherein the acidic polymer is a non-neutralized copolymer of ethylene and methacrylic acid present in an amount of from about 1% by weight to about 5% by weight based on total non-reinforced polymer.

16. The blend of claim 2 wherein said glass fibers are alkali metal silicate glass fibers.

17. The blend of claim 16 wherein said alkali metal silicate is sodium silicate.

18. The blend of claim 16 wherein said glass fibers contain a sizing material.

* * * * *